United States Patent
Weber et al.

(10) Patent No.: US 9,638,045 B2
(45) Date of Patent: May 2, 2017

(54) COOLING STRUCTURE FOR STATIONARY BLADE

(71) Applicant: General Electric Company, Schenectady, NY (US)

(72) Inventors: David Wayne Weber, Simpsonville, SC (US); Dustin Michael Earnhardt, Greenville, SC (US); Gregory Thomas Foster, Greer, SC (US); Michelle Jessica Iduate, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 381 days.

(21) Appl. No.: 14/288,976

(22) Filed: May 28, 2014

(65) Prior Publication Data

US 2015/0345300 A1    Dec. 3, 2015

(51) Int. Cl.
*F01D 5/18*    (2006.01)
*F01D 9/06*    (2006.01)

(52) U.S. Cl.
CPC ............... *F01D 5/18* (2013.01); *F01D 5/189* (2013.01); *F01D 9/065* (2013.01); *F05D 2240/81* (2013.01); *F05D 2250/185* (2013.01); *F05D 2260/201* (2013.01); *Y02T 50/676* (2013.01)

(58) Field of Classification Search
CPC ... F01D 5/08; F01D 5/18; F01D 5/181; F01D 5/183; F01D 5/188; F01D 5/189; F01D 9/06; F01D 9/065; F05D 2240/12; F05D 2240/126; F05D 2240/127; F05D 2240/81; F05D 2250/185; F05D 2260/201
See application file for complete search history.

(56) References Cited

U.S. PATENT DOCUMENTS

| 2,779,565 | A | | 1/1957 | Bruckmann | |
|---|---|---|---|---|---|
| 3,885,609 | A | | 5/1975 | Frei et al. | |
| 3,989,412 | A | | 11/1976 | Mukherjee | |
| 4,288,201 | A | * | 9/1981 | Wilson | F01D 5/189 415/115 |
| 4,962,640 | A | * | 10/1990 | Tobery | F01D 5/189 415/115 |
| 5,320,485 | A | * | 6/1994 | Bourguignon | F01D 5/187 415/115 |

(Continued)

FOREIGN PATENT DOCUMENTS

| EP | 2407639 A1 | 1/2012 |
|---|---|---|
| EP | 2469034 A2 | 6/2012 |

OTHER PUBLICATIONS

U.S. Appl. No. 14/271,823, Office Action 1 dated Oct. 20, 2016, 21 pages.

*Primary Examiner* — Nathaniel Wiehe
*Assistant Examiner* — Eric Zamora Alvarez
(74) *Attorney, Agent, or Firm* — Ernest G. Cusick; Hoffman Warnick LLC (57) ABSTRACT

A cooling structure for a stationary blade is provided. The cooling structure may include a first chamber in an endwall of the stationary blade directing a first cooling fluid from the stationary blade to a first cooling circuit, and a second chamber in the endwall of the stationary blade directing a second cooling fluid from the stationary blade to a second cooling circuit different than the first cooling circuit. The first cooling fluid has a lower temperature than the second cooling fluid.

11 Claims, 9 Drawing Sheets

(56) References Cited

U.S. PATENT DOCUMENTS

| | | | | |
|---|---|---|---|---|
| 5,344,283 A | * | 9/1994 | Magowan | F01D 5/187 415/115 |
| 5,387,085 A | * | 2/1995 | Thomas, Jr. | F01D 5/187 415/115 |
| 5,387,086 A | | 2/1995 | Frey et al. | |
| 5,630,700 A | * | 5/1997 | Olsen | F01D 5/189 415/134 |
| 5,772,398 A | * | 6/1998 | Noiret | F01D 5/189 415/115 |
| 5,954,475 A | * | 9/1999 | Matsuura | F01D 5/182 415/114 |
| 5,997,245 A | * | 12/1999 | Tomita | F01D 5/187 415/115 |
| 6,036,436 A | * | 3/2000 | Fukuno | F01D 5/187 415/115 |
| 6,065,928 A | * | 5/2000 | Rieck, Jr. | F01D 5/189 415/115 |
| 6,126,396 A | * | 10/2000 | Doughty | F01D 5/187 416/97 R |
| 6,142,730 A | * | 11/2000 | Tomita | F01D 5/187 415/114 |
| 6,428,270 B1 | * | 8/2002 | Leone | F01D 5/08 415/111 |
| 6,615,574 B1 | * | 9/2003 | Marks | F02C 7/18 60/772 |
| 6,761,529 B2 | | 7/2004 | Soechting et al. | |
| 7,204,675 B2 | * | 4/2007 | Texier | F01D 5/188 415/115 |
| 7,625,172 B2 | | 12/2009 | Walz et al. | |
| 7,686,581 B2 | * | 3/2010 | Brittingham | F01D 5/187 416/97 R |
| 7,785,067 B2 | | 8/2010 | Lee et al. | |
| 7,967,567 B2 | * | 6/2011 | Liang | F01D 5/186 415/115 |
| 8,011,881 B1 | * | 9/2011 | Liang | F01D 5/187 415/115 |
| 8,079,814 B1 | * | 12/2011 | Liang | F01D 5/187 415/115 |
| 8,096,767 B1 | * | 1/2012 | Liang | F01D 5/187 415/115 |
| 8,096,772 B2 | | 1/2012 | Liang | |
| 8,100,654 B1 | * | 1/2012 | Liang | F01D 5/187 416/97 R |
| 8,231,329 B2 | | 7/2012 | Benjamin et al. | |
| 8,356,978 B2 | | 1/2013 | Beattie et al. | |
| 8,439,643 B2 | | 5/2013 | Kuhne et al. | |
| 2007/0160475 A1 | * | 7/2007 | Rogers | F01D 5/186 416/96 R |
| 2010/0129196 A1 | * | 5/2010 | Johnston | F01D 5/188 415/115 |
| 2010/0239432 A1 | * | 9/2010 | Liang | F01D 11/001 416/97 R |
| 2011/0058957 A1 | | 3/2011 | Von Arx et al. | |
| 2011/0189000 A1 | | 8/2011 | Vedhagiri et al. | |
| 2013/0004295 A1 | | 1/2013 | Naryzhny et al. | |
| 2013/0028735 A1 | | 1/2013 | Burt et al. | |
| 2014/0000285 A1 | | 1/2014 | Bergman et al. | |

\* cited by examiner

COOLING STRUCTURE FOR STATIONARY BLADE

BACKGROUND OF THE INVENTION

The disclosure relates generally to stationary blades, and more particularly, to a cooling structure for a stationary blade.

Stationary blades are used in turbine applications to direct hot gas flows to moving blades to generate power. In steam and gas turbine applications, the stationary blades are referred to as nozzles, and are mounted to an exterior structure such as a casing and/or an internal seal structure by endwalls. Each endwall couples to an end of the airfoil part of the stationary blade. Each endwall includes a core that extends outwardly from an end of the airfoil.

In order to operate in extreme temperature settings, the airfoil and endwalls need to be cooled. For example, in some settings, a cooling fluid is pulled from the wheel space and directed to internal end walls for cooling. In contrast, in many gas turbine applications, later stage nozzles may be fed cooling fluid, e.g., air, extracted from a compressor thereof. Outer diameter endwalls receive the cooling fluid directly, while inner diameter endwalls receive the cooling fluid after it is routed through the airfoil from the outer diameter. Conventionally, this routing is performed by passing the cooling fluid through an impingement insert (also known as a baffle) within a core opening of the airfoil and into a pressurized diaphragm that is separate from and positioned radially internal from the endwall. Once the cooling fluid is in the diaphragm, the cooling fluid is directed radially outward to a cooling circuit in the endwall. The endwall cooling circuit can take a variety of forms such as a pin-pedestal arrangement and/or a serpentine passage in the endwall that directs the cooling fluid to necessary portions of the cores thereof.

The diaphragm arrangement presents a number of challenges. One challenge is the physical space required for the parts that create the diaphragm require the turbine to be longer, or there may not be room for wheelspace sealing innovations such as near flow path seals. Creating the diaphragm is also a complex process in that it must fit in a very short/small space and requires complex machining (or other manufacturing steps) after the stationary blade is cast.

BRIEF DESCRIPTION OF THE INVENTION

A first aspect of the disclosure provides a cooling structure for a stationary blade, comprising: a first chamber in an endwall of the stationary blade directing a first cooling fluid from the stationary blade to a first cooling circuit; and a second chamber in the endwall of the stationary blade directing a second cooling fluid from the stationary blade to a second cooling circuit different than the first cooling circuit, wherein the first cooling fluid has a lower temperature than the second cooling fluid.

A second aspect of the disclosure provides a stationary blade comprising: an airfoil having an impingement insert in a core opening thereof, the impingement insert including a plurality of impingement holes through a sidewall thereof and an insert passage at an end thereof and a cooling structure in the endwall of the airfoil, the cooling structure including: a first chamber in the endwall of the stationary blade directing a first cooling fluid from the airfoil to a first cooling circuit; and a second chamber in the endwall of the stationary blade directing a second cooling fluid from the airfoil to a second cooling circuit different than the first cooling circuit, wherein the first cooling fluid passes through the airfoil without passing through the plurality of impingement holes and the second cooling fluid passes through the plurality of impingement holes to cool the airfoil such that the first cooling fluid has a lower temperature than the second cooling fluid.

A third aspect of the disclosure provides a cooling structure for a stationary blade having an airfoil having a serpentine airfoil cooling circuit therein, comprising: a first chamber in an endwall of the stationary blade directing a first cooling fluid from the stationary blade to a first cooling circuit; a second chamber in the endwall of the stationary blade directing a second cooling fluid from the stationary blade to a second cooling circuit different than the first cooling circuit, wherein the first cooling fluid is extracted from the serpentine airfoil cooling circuit at a first location and the second cooling fluid is extracted from the serpentine airfoil cooling circuit at a second location, the second location being downstream from the first location such that the first cooling fluid has the lower temperature than the second cooling fluid; a first cooling fluid passage in an endwall of the stationary blade and extending from the first chamber to the first cooling circuit; and a second cooling fluid passage in the endwall of the stationary blade and extending from the second chamber to the second cooling circuit.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

As indicated above, the disclosure provides a cooling structure for a stationary blade. The cooling structure may take a variety of forms, as will be described herein. In one embodiment, the cooling structure may include a first chamber in an endwall of the stationary blade directing a first cooling fluid from the stationary blade to a first cooling circuit, and a second chamber in the endwall of the stationary blade directing a second cooling fluid from the stationary blade to a second cooling circuit different than the first cooling circuit. The first cooling fluid has a lower temperature than the second cooling fluid. Since each chamber is internal to the endwall and, in particular, within an endwall core opening created during casting of the blade, the disclosure removes the need to have a relatively large and leaky pressurized diaphragm. Each chamber may be formed by capping (e.g., through welded sheet metal members) the endwall core opening volume left by the airfoil casting cores after they are removed. Where an impingement insert is used, the cooling structure may use airfoil post-impingement insert cooling fluid and/or fresh pre-impingement insert cooling fluid that exits the airfoil. In this manner, the cooling structure allows use of cooler (higher cooling capacity) pre-impingement cooling fluid only where necessary and the warmer (lower cooling capacity) post-impingement cooling fluid where appropriate, and provide direct cooling flow savings overall to the particular application. Similar benefits can be obtained for a stationary blade employing a serpentine airfoil cooling circuit by pulling cooling fluid from different locations of the airfoil cooling circuit.

Figure 1:
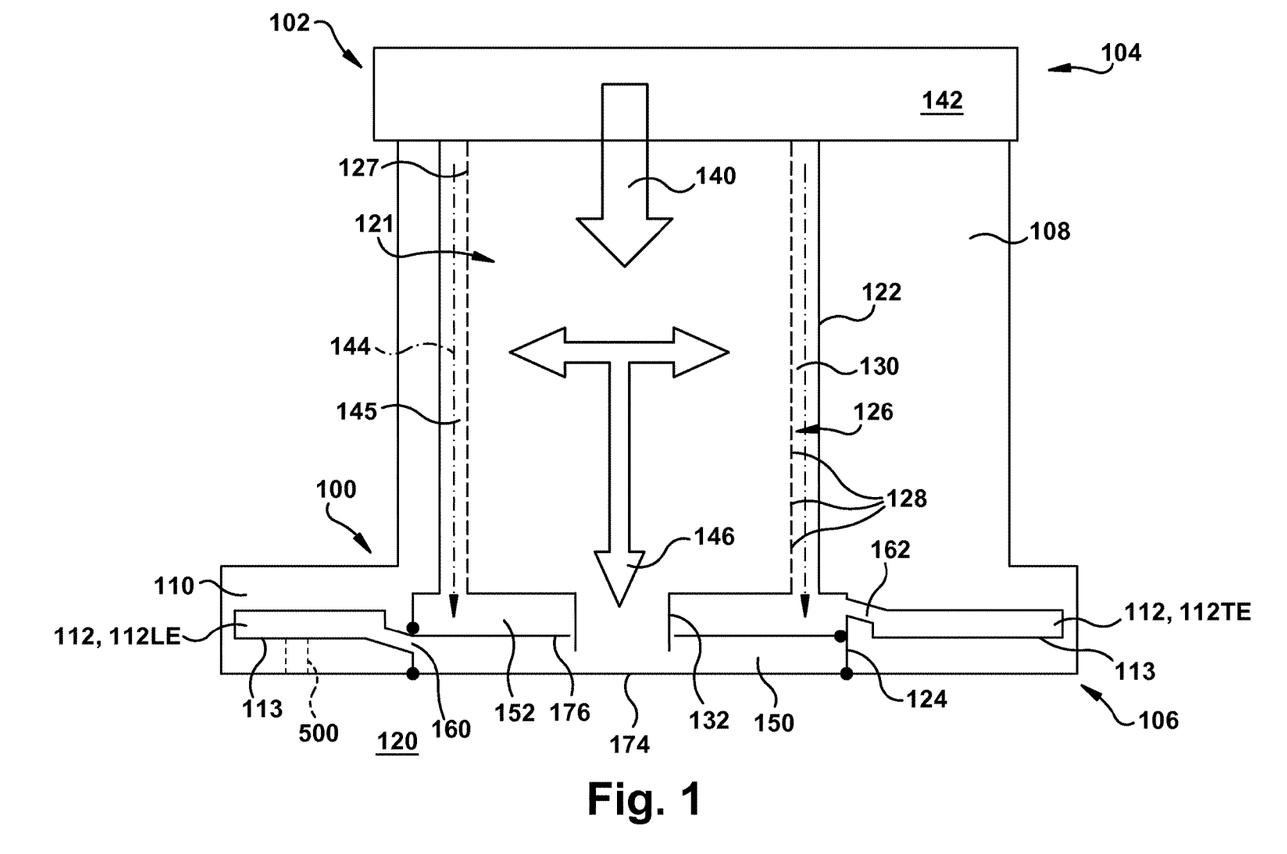
FIG. 1 shows a schematic cross-sectional view of one embodiment of a stationary blade including a cooling structure according to the disclosure.
Figure 2:
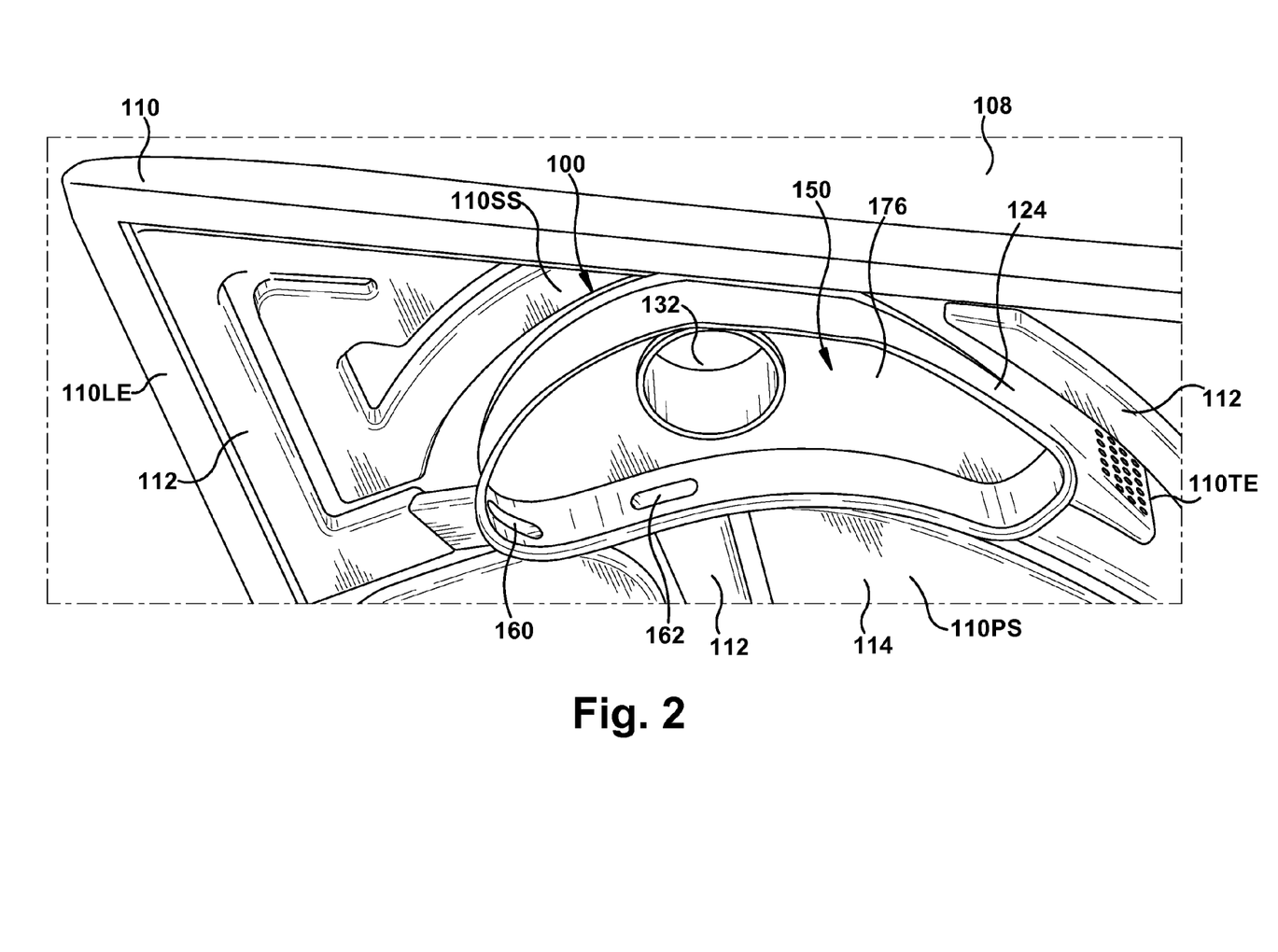
FIG. 2 shows radially outward perspective and see-through view of an end of the stationary blade of FIG. 1.
Figure 3:
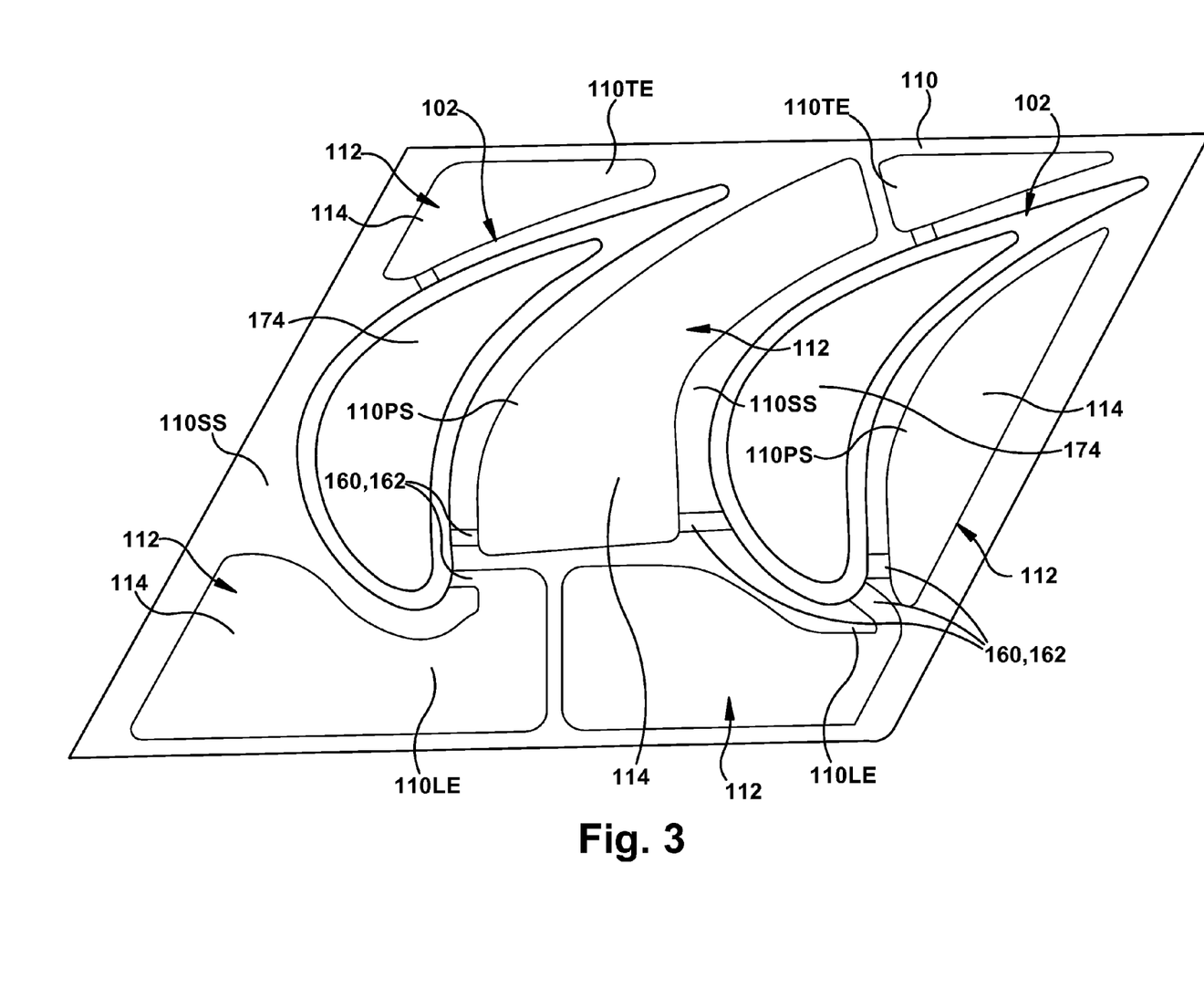
FIG. 3 shows radially outward, cross-sectional view of a two stationary blade arrangement.

Referring to FIGS. 1-3, a cooling structure 100 for a stationary blade 102 is illustrated in a schematic cross-section. Stationary blade 102 includes an outer radial end 104 that may be mounted to a stationary structure such as a casing (not shown) of a turbine engine. An inner radial end 106 of stationary blade 102 may be sealed in a conventional fashion to a rotor (not shown). Stationary blade 102 may include any now known or later developed material appropriate for the application in which it is used, e.g., a high temperature steel, and may be formed by casting. Stationary blade 102 includes an airfoil 108 coupled to an endwall 110. Airfoil 108 acts to direct a working fluid flow towards a number of rotating blades (not shown) mounted to a rotor (not shown) that are adjacent to stationary blade 102. As illustrated for description purposes, endwall 110 includes an enlarged area at an inner radial end of stationary blade 102 that includes a number of cooling circuits 112 in a core 113 portion thereof. It is emphasized that a similar endwall may also be positioned at outer radial end 104 of stationary blade 102; the teachings of the disclosure apply equally to an endwall positioned at outer radial end 104.

Referring to FIGS. 2 and 3, a number of example cooling circuits 112 are illustrated. FIG. 2 shows a single stationary blade 102 with various cooling circuits 112 therein, and FIG. 3 shows a pair of stationary blades 102 sharing an endwall 110 and having various cooling circuits 112 therein. Cooling circuits 112 may extend through any portion of endwall 110 and perhaps into portions of airfoil 108 or a wheel space 120 (FIG. 1) adjacent to stationary blade 102. As known in the art, and as shown best in FIG. 2, each cooling circuit 112 may take a serpentine path through a particular portion of endwall 110, e.g., a leading edge portion 110LE, a trailing edge portion 110TE, a pressure side portion 110PS and/or a suction side portion 110SS. Alternatively, as shown in FIG. 3, each cooling circuit 112 may employ various pin-and-pedestal cooling structures 114 positioned in a particular portion of endwall 110, e.g., a leading edge portion 110LE, a trailing edge portion 110TE, a pressure side portion 110PS and/or a suction side portion 110SS. Where desired, serpentine paths and pin-and-pedestal structures may also be employed together, as shown in FIG. 2. In addition to cooling circuits 112 in endwall 110, airfoil 108 may also include an airfoil cooling circuit 121 therein that, as will be described herein, may take a variety of forms.

Returning to FIG. 1, in one embodiment, airfoil cooling circuit 121 may employ one or more impingement inserts 126 (also known as an impingement baffle). More particularly, in one embodiment, when stationary blade 102 is cast, a removable core (not shown) is provided that creates a core opening 122 through airfoil 108 thereof and an endwall core opening 124 in endwall 110 thereof. In the FIGS. 1-3 embodiment, a single impingement insert 126 is positioned in core opening 122. Impingement insert 126 includes a plurality of impingement holes 128 extending through a sidewall wall 130 thereof. A radially outer end 127 of impingement insert 126 is open to receive first cooling fluid 140. Impingement insert 126 may also include an insert passage 132 at an end thereof adjacent to endwall 110. As illustrated, insert passage 132 extends into endwall core opening 124, but this may not be necessary in all instances. Impingement insert 126 may have a cross-sectional shape to allow positioning thereof within core opening 122 creating an airfoil passage 145 between an exterior surface thereof and an interior surface of core opening 108. Insert 126 may also be shaped (cross-section and lengthwise) to substantially mimic the interior of core opening 122.

In operation, a first cooling fluid 140 enters impingement insert 126 from a source of cooling fluid. The source may be any now known or later developed manner of providing a cooling fluid for stationary blade 102, e.g., an extraction from a compressor (not shown), extraction from a casing or another part of the turbine, etc. The cooling fluid may include any appropriate material such as air, steam and other gases typically used for cooling in the particular turbine application. While one source 140 has been illustrated, it is emphasized that cooling fluid 140 may be provided in a number of flows, i.e., with a number of cooling fluids having different characteristics such as temperature, pressure, flow rate, etc. Each cooling fluid 140 can be directed relative to impingement insert 126 via various passages and chambers in end 104 of stationary blade 102 as known in the art, e.g., in a radial outer endwall of the blade. In any event, a portion of first cooling fluid 140 passes through plurality of impingement holes 128 to cool airfoil 108, i.e., by impinging cooling fluid 140 against an interior surface of core opening 122 of airfoil 108. In so doing, a second cooling fluid 144 (dashed arrows on either side of insert 126) is created that has a higher temperature than first cooling fluid 140, i.e., by way of absorbing heat from airfoil 108. Second cooling fluid 144 flows through airfoil passage 145 between impingement insert 126 and airfoil core opening 122. A remaining portion 146 of first cooling fluid 140 passes through insert passage 132 in endwall core opening 124 without passing through plurality of impingement holes 128, thus retaining a lower temperature than that of second cooling fluid 144. That is, insert passage 132 delivers the cooler first cooling fluid 140 to endwall core opening 124. First cooling fluid 140 (146) may be referred to as "pre-impingement" cooling fluid and second cooling fluid may be referred to as "post-impingement" cooling fluid based on their interaction with impingement holes 128.

In conventional systems, both cooling fluids 140, 142 would be received in a pressurized diaphragm positioned radially internally of endwall 110 and then redirected back to cooling circuits 112. In contrast, cooling structure 100 according to embodiments of the disclosure includes a first chamber 150 in endwall 110 of stationary blade 102 directing first cooling fluid 140 from stationary blade 102 to a first cooling circuit (e.g., 112LE); and a second chamber 152 in endwall 110 of stationary blade 102 directing second cooling fluid 144 from stationary blade 102 to a second cooling circuit (e.g., 112TE) different than first cooling circuit 112LE. As noted above, first cooling fluid 140 has a lower temperature than second cooling fluid 144. Use of chambers 150, 152 allows use of the higher cooling capacity first cooling fluid 140 for appropriate higher-need cooling, and the lower cooling capacity second cooling fluid 144 for lower-need cooling. In the example shown, first cooling circuit 112LE is positioned in a leading edge portion 110LE (FIGS. 2-3) of endwall 110, and second cooling circuit 112TE is positioned in a trailing edge portion 110TE (FIGS. 2-3) of endwall 110. In this fashion, first cooling circuit 112LE, which may require more cooling than second cooling circuit 112TE at a trailing edge of endwall 110, receives the higher cooling capacity first cooling fluid 140. Similarly, portions that may not require such high cooling capacity cooling fluid receive less cooling capacity cooling fluid. The overall effect is to efficiently use the available cooling fluids, thus increasing the overall efficiency of the turbine. It is emphasized that although first and second cooling circuits 112LE and 112TE are shown, respectively, as being in a leading edge and trailing edge of endwall 110, they may be located in or extend into other portions of endwall 110 also.

Each chamber 150, 152 may be fluidly coupled to a respective cooling circuit 112 in any fashion. In one embodiment, each chamber 150, 152 may simply open to a respective cooling circuit, i.e., be considered part of the circuit. In other embodiments, cooling fluid passages may be required to fluidly couple chambers 150, 152 to respective cooling circuits. For example, in the FIG. 1 embodiment, a first cooling fluid passage 160 in endwall 110 of stationary blade 102 extends from first chamber 150 to first cooling circuit 112LE, and a second cooling fluid passage 162 in endwall 110 of stationary blade 102 extends from second chamber 152 to second cooling circuit 112TE. Although two passages have been illustrated, it is understood that any number of passages may be provided to deliver the particular cooling fluid to any cooling circuit. See e.g., FIG. 3, left side stationary blade 102, in which three passages 160, 162 extend from one or more chambers (not numbered). Further each passage does not necessarily have to pass from a chamber in the direction illustrated in FIG. 1, i.e., toward a leading edge and a trailing edge. For example, FIGS. 2 and 3 show passages 160, 162 extending towards various sides of endwall 110.

Figure 4:
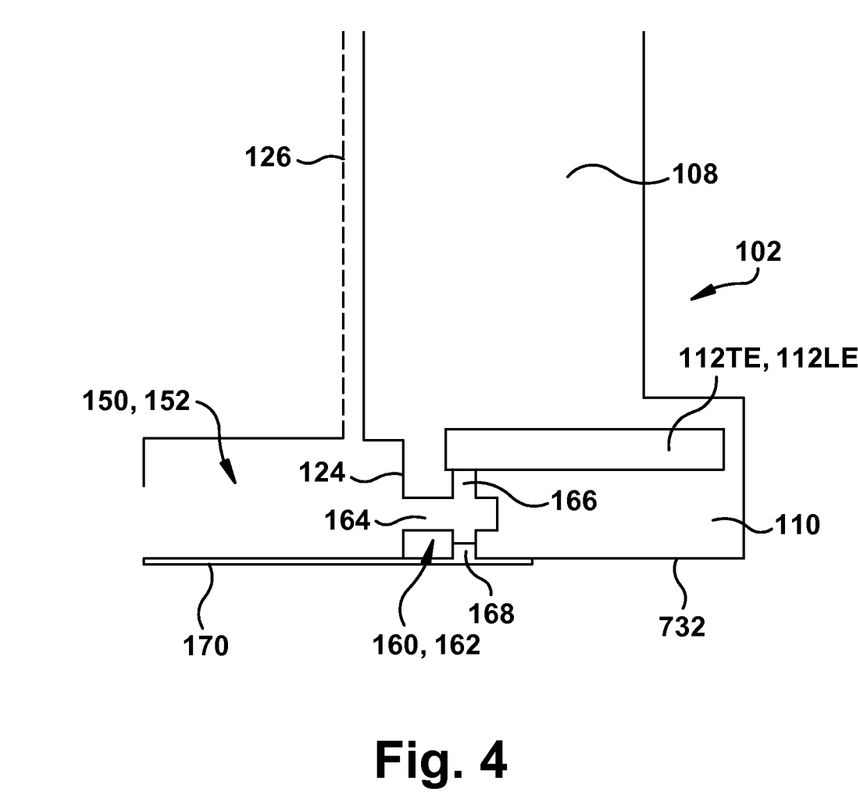
FIG. 4 shows a schematic cross-sectional view of one alternative embodiment of an endwall core opening.

Each passage 160, 162 may be formed in any known fashion such as machining or casting in-place. In one particular embodiment according to the disclosure illustrated in FIG. 4, at least one of first and second cooling fluid passages 160, 162 includes a two-part passage including a first passage 164 extending laterally from a respective one of the first and second chambers 150, 152, and a second passage 166 intersecting first passage 164 and extending from an open end at an exterior surface 732 of endwall 110 to the respective first cooling circuit 112TE or second cooling circuit 112LE. Each of the first and second passages 164, 166 can be readily formed using any boring process, e.g., drilling, etc. The open end of second passage 166 may be closed by at least one of a plug 168 and a cover member 170 (both shown in FIG. 4, only one necessary), thus forming the respective cooling fluid passage 160, 162. As illustrated, cover member 170 may be part of a sheet metal member used to form chamber(s) 150, 152, as will described in greater detail herein, or it could be a separate element.

First and second chambers 150, 152 may be formed in a number of ways. In one embodiment, shown in FIG. 1, a first chamber closure 174 may be coupled to at least endwall core opening 124 to create first chamber 150. As noted herein, first chamber 150 is in fluid communication with insert passage 132 in impingement insert 126 such that first cooling fluid 140 (portion 146) may enter first chamber 150. In addition, a second chamber closure 176 may be coupled to at least endwall core opening 124 to create second chamber 152. As noted herein, second chamber 152 is in fluid communication with airfoil passage 145 in airfoil 108 delivering second cooling fluid 144. In this example, as best observed in FIG. 3, first chamber closure 174 may include a member in the form of a shaped sheet metal member or other element to enclose endwall core opening 124. That is, first chamber closure 174 includes a member closing endwall core opening 124 to create first chamber 150 with the member. For example, as shown in FIG. 3, first chamber closure 174 may be tear drop shaped. Also in this example, second chamber closure 176 may include a member in the form of, for example, a shaped sheet metal member to enclose endwall core opening 124 (i.e., at a radially outward position relative to closure 174) and allow insert passage 132 to pass therethrough. That is, where insert passage 132 extends a length from an end of impingement insert 126, and second chamber closure 176 includes a member coupled to the length of insert passage 132 and an interior surface of endwall core opening 124 to create second chamber 152. Where insert passage 132 does not extend into endwall core opening 124, closure 176 may simply mate with passage 132. FIG. 2 illustrates first chamber 150 with first chamber closure 174 (FIGS. 1 and 3) removed revealing second chamber closure 176 and its interaction with endwall core opening 124 and insert passage 132. Here, second chamber closure 176 may also have a somewhat tear drop outer shape. Each closure 174, 176 may be made of a material capable of being fixedly attached to endwall core opening 124, e.g., by welding—see weld location spots.

Figure 5:
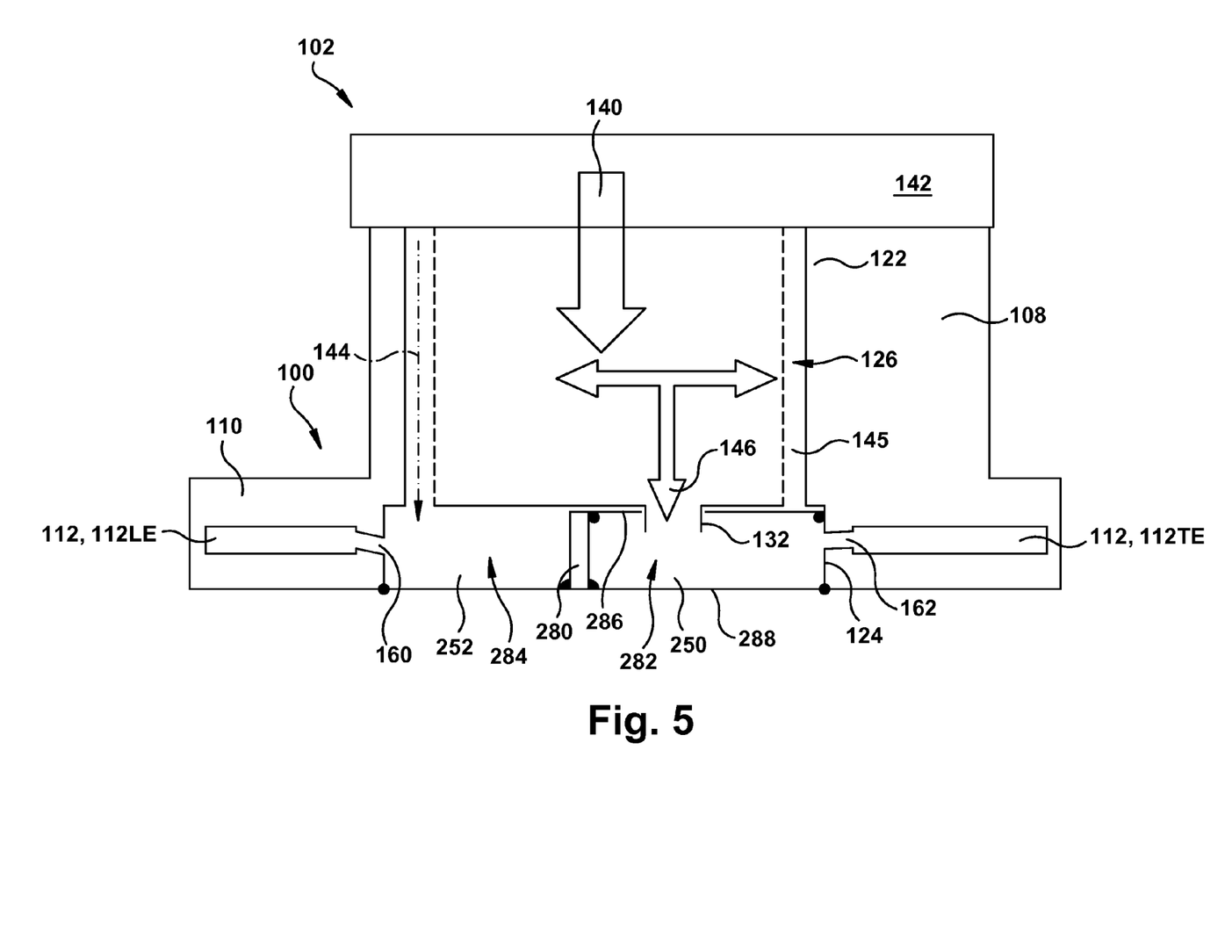
FIG. 5 shows a schematic cross-sectional view of another embodiment of a stationary blade including a cooling structure.

FIG. 5 illustrates another embodiment of how a first and second chamber 250, 252, respectively, may be formed. The FIG. 5 embodiment is similar to that of FIG. 1, except the first chamber closure and second chamber closure collectively include: a first member 280 dividing a space of endwall core opening 124 between a first area 282 receiving first cooling fluid 140 (portion 146 not passing through impingement insert 126) from insert passage 132 in impingement insert 126, and a second area 284 receiving second cooling fluid 144 from airfoil passage 145 in airfoil 108. First member 280 may be cast in place with airfoil 108 and endwall 110, or may be added later by, for example, welding. A second member 286 blocks second cooling fluid 144 flow from entering first area 282 from airfoil passage 145 in airfoil 108. Further, a third member 288 couples to first member 280 and closes endwall core opening 124 to form first chamber 250 in first area 282 and second chamber 252 in second area 284. Each member 286, 288 may include a sheet metal member and have any shape necessary to fit its location and allow for coupling to surrounding structure. For example, member 276 may be partially tear drop shaped with an opening therein for insert passage 132, and member 288 may be somewhat tear drop shaped similar to closure 174 (FIG. 3). Each member 286, 288 may be made of a material capable of being fixedly attached to endwall core opening 124, e.g., by welding—see weld location spots.

Figure 6:
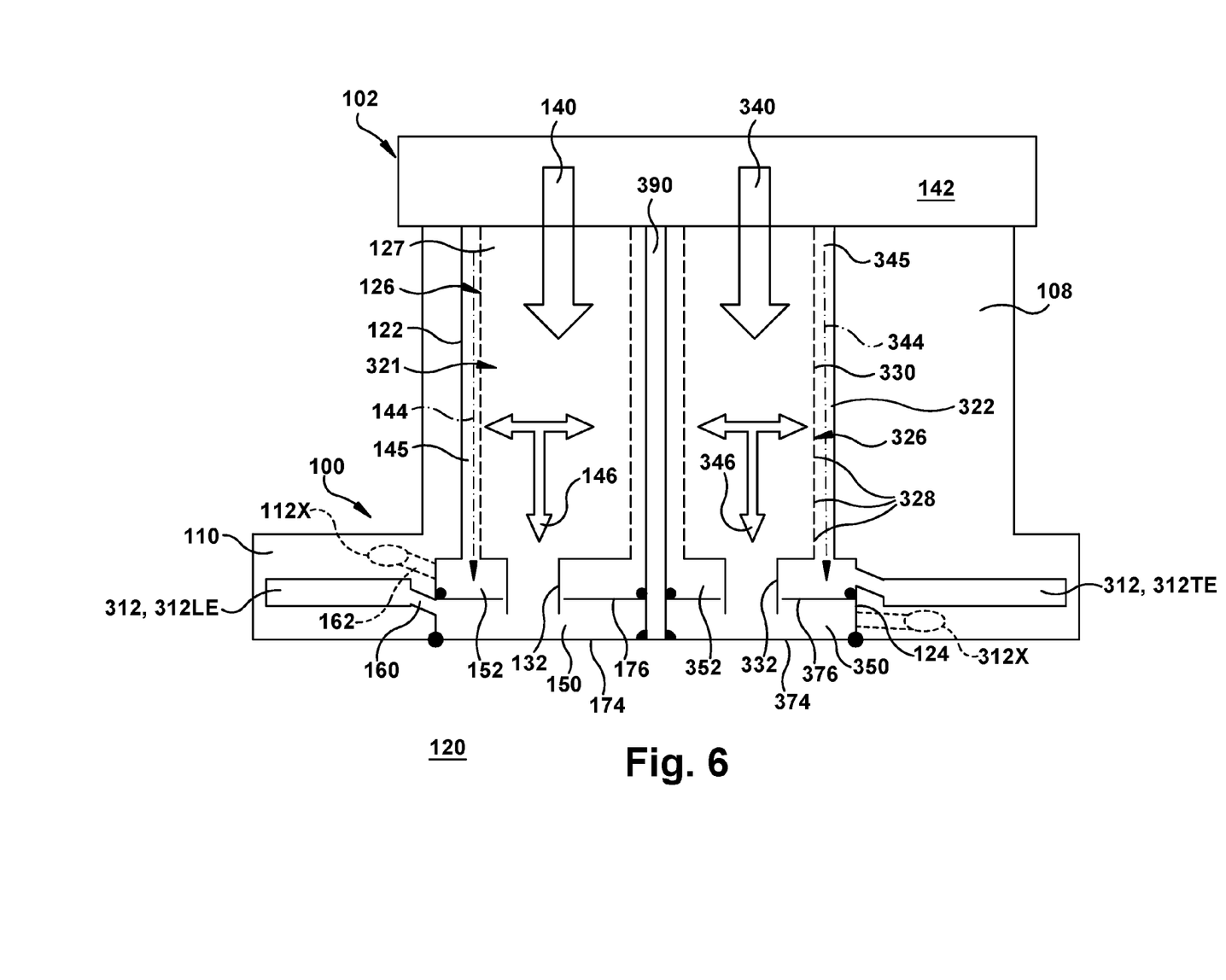
FIG. 6 shows a schematic cross-sectional view of an alternative embodiment of a stationary blade including a cooling structure.

The heretofore described cooling structure includes two chambers for directing cooling fluids having different temperatures to appropriate cooling circuits. Referring to FIG. 6, in another embodiment, a cooling structure 100 according to the disclosure may also include a third chamber 350 and a fourth chamber 352, each chamber for directing a cooling fluid having different temperatures to different cooling circuits. That is, a third chamber 350 in endwall 110 of stationary blade 102 directs a third cooling fluid 340 (portion 346) from stationary blade 102 to a third cooling circuit 312X, different than first and second cooling circuits, e.g., 112LE, 112X. Second cooling circuit 112X and third cooling circuit 312X are shown as phantom circles as they may extend to a number of locations into or out of the page, e.g., as shown in FIG. 3, into endwall suction side portion 110SS. Further, a fourth chamber 352 in endwall 110 of stationary blade 102 directs a fourth cooling fluid 344 from stationary blade 102 to a fourth cooling circuit 312TE different than first (e.g., 112LE), second (e.g., 112X) and third cooling circuits 312X. Although first and fourth cooling circuits 112LE and 312TE are shown, respectively, as being in a leading edge and trailing edge of endwall 110, it is understood that they may located in or extend into other portions of endwall 110 also.

In this embodiment, a leading edge portion of airfoil 108 (left side of FIG. 6) is substantially similar to that of FIG. 1, but airfoil 108 may also include an additional core opening 322, i.e., in addition to core opening 122. A divider 390 may be provided within airfoil 108 to separate each core opening 122, 322. Divider 390 may be cast with stationary blade 102 or be added after casting. Airfoil cooling circuit 321 may further include a second impingement insert 326 in second core opening 322 of airfoil 108. Second impingement insert 326 includes a second plurality of impingement holes 328 extending through a sidewall wall 330 thereof and a second insert passage 332 at an end thereof adjacent to endwall 110. A portion of third cooling fluid 340 passes through second plurality of impingement holes 328 to cool airfoil 108 and create fourth cooling fluid 344 (dashed arrows, right side in airfoil passage 345), and a remaining portion 346 of third cooling fluid 340 passes through second insert passage 332 without passing through second plurality of impingement holes 328. First cooling fluid 140 and third cooling fluid 340 may originate from different sources, e.g., a compressor extraction and a casing extraction, and have different temperatures. In this case, first cooling fluid 140 may have a lower temperature than third cooling fluid 340. Second cooling fluid 144 may be hotter or cooler than third cooling fluid 340, and fourth cooling fluid 344 may be hotter or cooler than second cooling fluid 144. As can be seen in FIG. 6, divider 390 may divide endwall core opening 124 into two areas that can be segmented by two sets of first and second chamber closures 174, 176 and 374, 376, respectively. Each closure may include a member in the form of a sheet metal member shaped to enclose a respective portion of endwall core opening, e.g., with divider 390, first insert passage 132 and/or second insert passage 332. First chamber closure 174, 374 may be formed of two members or may be a single member.

Figure 7:
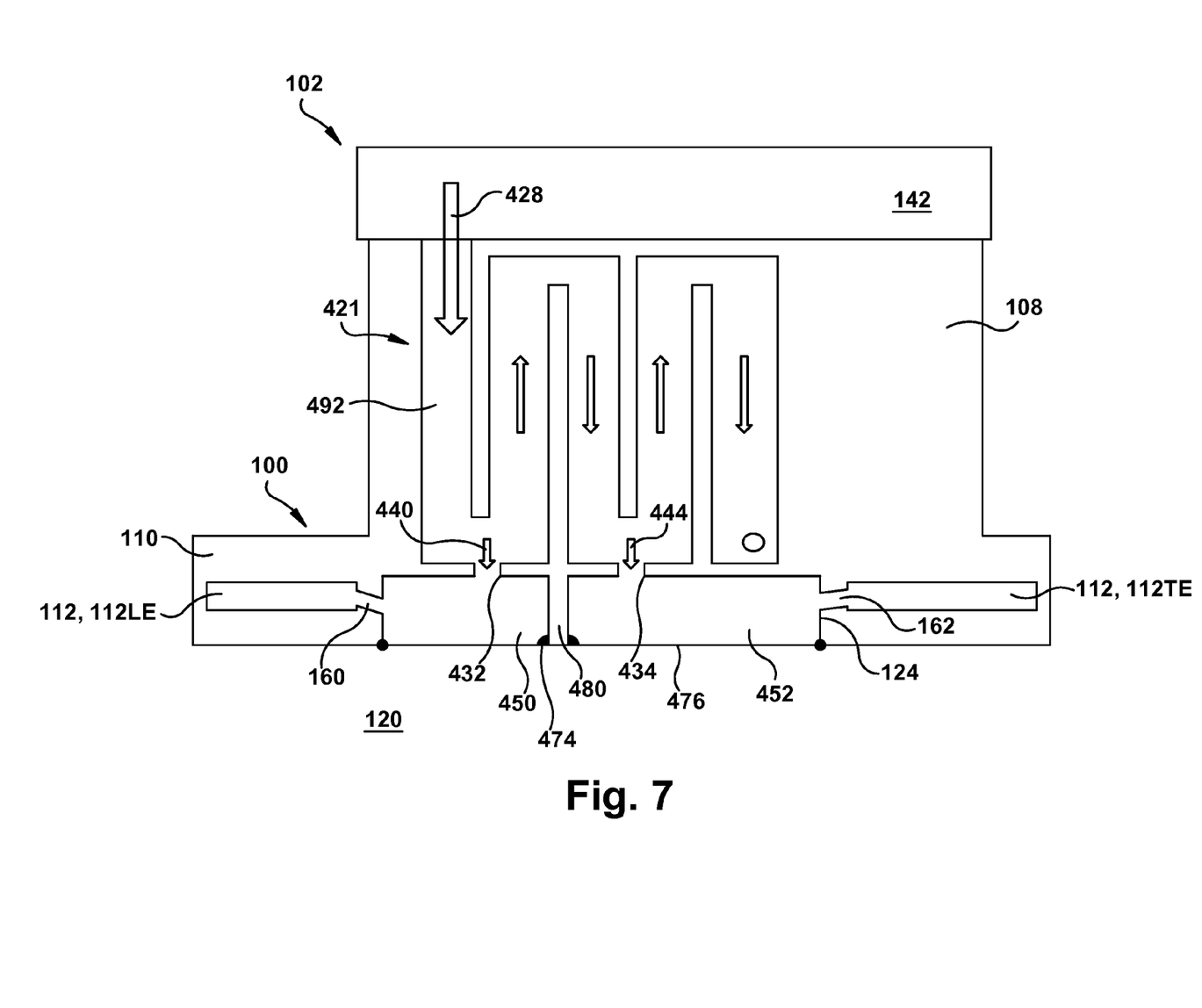
FIG. 7 shows a schematic cross-sectional view of another embodiment of a stationary blade having a serpentine airfoil cooling circuit and including a cooling structure.
Figure 8:
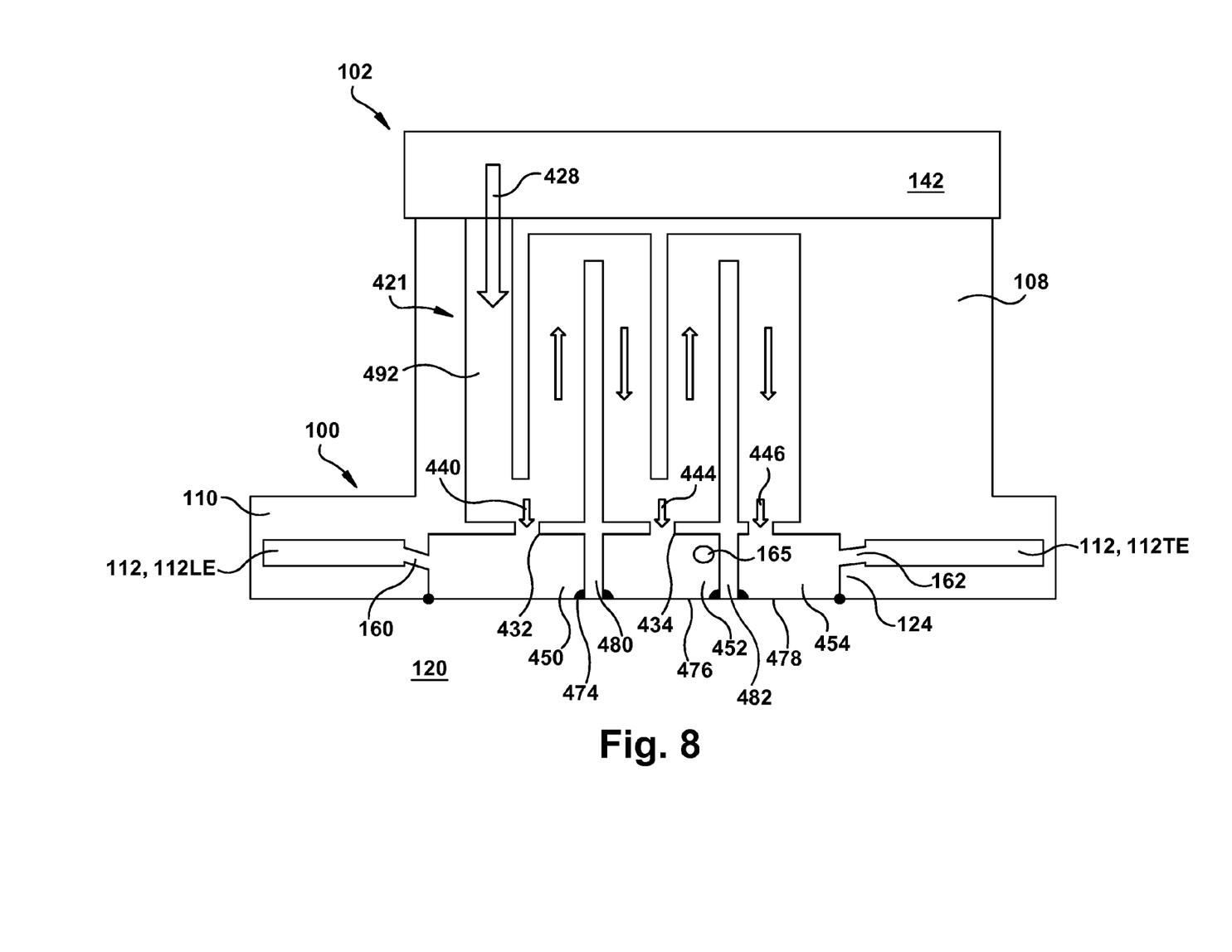
FIG. 8 shows a schematic cross-sectional view of an alternative embodiment of a stationary blade having a serpentine airfoil cooling circuit and including a cooling structure.

Referring to FIGS. 7 and 8, an alternative embodiment of an airfoil cooling circuit 421 for a stationary blade 102 that implements a cooling structure 100 according to embodiments of the disclosure is illustrated. In this embodiment, as shown in FIG. 7, an airfoil cooling circuit 421 rather than including impingement insert(s), includes a single cooling fluid path 492. In the embodiments illustrated, airfoil cooling circuit 421 includes a conventional serpentine cooling circuit, i.e., one that moves in opposing paths within airfoil 108. It is noted, however, that routes other than those that are serpentine may be possible. Here, a cooling fluid 428 is directed into a first end of airfoil cooling circuit 421 and is directed along path 492, cooling airfoil 108 as it progresses. Consequently, as cooling fluid 428 progresses through path 492, it becomes hotter. Here, as in previous embodiments, cooling structure 100 includes first chamber 450 in endwall 110 of stationary blade 102 directing a first cooling fluid 440 from stationary blade 102 to a first cooling circuit (e.g., 112LE via passage 160), and second chamber 452 in endwall 110 of stationary blade 102 directing a second cooling fluid 444 from stationary blade 102 to a second cooling circuit (e.g., 112TE via passage 162) different than the first cooling circuit. A first cooling fluid passage 160 in endwall 110 of stationary blade 102 extends from first chamber 450 to first cooling circuit (e.g., 112LE), and a second cooling fluid passage 152 in endwall 110 of stationary blade 102 extends from second chamber 452 to second cooling circuit (e.g., 112TE). Each chamber 450, 452 is formed within endwall core opening 124, formed after a casting core is removed from endwall 110. Here, however, first cooling fluid 440 is extracted from airfoil cooling circuit 421 at a first location 432 and second cooling fluid 444 is extracted from airfoil cooling circuit 421 at a second location 434 that is downstream from first location 432 such that first cooling fluid 440 has the lower temperature than second cooling fluid 444. Chambers 450, 452 may be formed as described herein by one or more closure(s) 474, 476, perhaps with the use of a core opening divider 480 that separates endwall core opening 124 into two areas. One closure 474 may span the entire endwall core opening 124 and be secured, e.g., by welding, to form chambers 450, 452, perhaps with welds to divider 480, or a number of closures 474, 476 may be employed. Closure(s) 474, 476 may include sheet metal members. Divider 480 may be cast with airfoil 108 or later added, e.g., via welding. Each extraction location 432, 434 may be formed by creating an opening from path 492 to a respective chamber within endwall core opening 124.

Referring to FIG. 8, a third chamber 454 may be provided in endwall 110 of stationary blade 102 directing a third cooling fluid 446 from the stationary blade to a third cooling circuit (e.g., 112TE via passage 162), that is different than both the first and second cooling circuits. Here, second chamber 452 in endwall 110 of stationary blade 102 may direct second cooling fluid 444 from stationary blade 102 to a second cooling circuit (not shown) located into or out of the page via a passage 165. As shown in FIG. 3, the third cooling circuit could be located on a suction side (e.g., 110SS) of stationary blade 102. Third chamber 454 may be formed as described relative to first and second chambers 450, 452. That is, by using one or more closure(s) 474, 476, 478 perhaps with the use of one or more core opening dividers 480, 482 that separates endwall core opening 124 into three areas. That is, one closure 474 may span the entire endwall core opening 124 and be secured, e.g., by welding, to form chambers 450, 452, 454, perhaps with welds to dividers 480, 482, or a number of closures 474, 476, 478 may be employed. Member(s) 474, 476, 478 may include sheet metal members. Dividers 480, 482 may be cast with airfoil 108 or later added, e.g., via welding. In the FIG. 8 embodiment, second chamber 452 may include passage 165 to the second cooling circuit.

Figure 9:
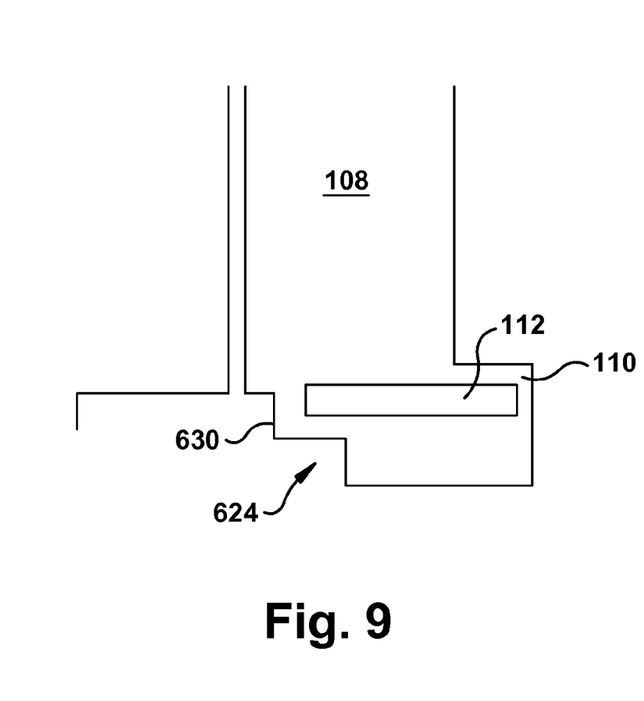
FIGS. 9 and 10 show schematic cross-sectional views of alternative embodiments of an endwall core opening.
Figure 10:
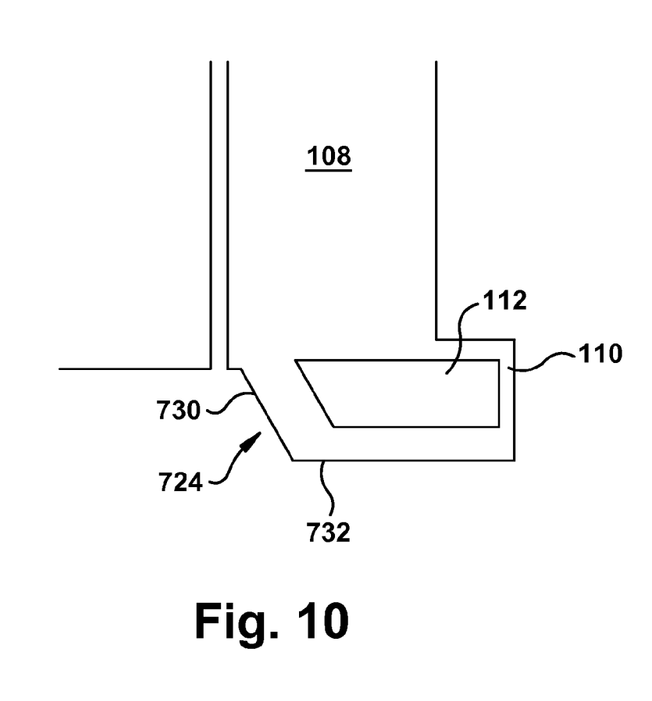

Heretofore, each endwall core opening 124 has been illustrated as including a straight internal surface, side wall. FIGS. 9 and 10 show schematic cross-sectional views of alternative embodiments of an endwall core opening 624, 724, respectively, that can be employed in any of the herein described cooling structure 100 embodiments. In FIG. 9, endwall core opening 624 includes an internal surface 630 that is stepped, and in FIG. 10, endwall core opening 724 includes an internal surface 730 that is angled relative to an exterior surface 732 of endwall 110. Any of the various surfaces may be employed where appropriate to provide adequate access, e.g., for creating passages to cooling circuits, and/or ensure positioning of any closure, e.g., via welding, seating, wedging, etc. Each of the surfaces can be created during casting by appropriate shaping of the casting core used for endwall 110 and/or by appropriate machining.

It is understood that the embodiments described herein can include a number of alternative structures to provide additional efficiency gains. In one example, shown in FIG. 1 in phantom, at least one of cooling circuits (112LE as illustrated) may include a delivery passage 500 to a wheel space 120 adjacent to stationary blade 102. Delivery passage 500 may be at any desired location within any of the cooling circuits 112, and may be employed in any embodiment. In addition, while most of the cooling fluids have been described herein as being either from a single, original source or derived therefrom, it is emphasized that different cooling fluids may originate from different sources. For example, in the two impingement inserts embodiment of FIG. 6, cooling fluid flows 140 and 340 were described as possibly from different sources, e.g., a compressor extraction and a casing extraction. Such multiple source arrangements are also applicable to the other embodiments. For example, where two airfoil serpentine cooling circuits are employed in an airfoil 108, two sources may be employed to create the different temperature cooling fluids, one for each path, and a chamber may be provided to pull from each respective path.

While the teachings of the disclosure have been described herein with reference to endwall 110 being an inner endwall, it is emphasized that the teachings of the disclosure are equally applicable to an outer endwall at end 104 (FIG. 1). Further, while passages from certain chambers have been illustrated as directing a cooling fluid to a particular cooling circuit, it is emphasized that passages from a particular chamber can be directed to practically any cooling circuit of stationary blade 102 and/or wheel space 120. Each passage from a chamber may be machined and/or cast. In terms of the latter methodology, features to one or both of the sidewall cores or the airfoil core may be added to make post-cast machining operations that connect the cooling circuits and chambers more reproducible and cost effective. For example, tabs may be created on one or more of the cores that overlap in some fashion and allow an easier drilling operation to open to the respective cooling circuit.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemmemberd.

What is claimed is:

1. A cooling structure for a stationary blade, comprising:
a first chamber in an endwall core opening of the stationary blade directing a first cooling fluid from an impingement insert of the stationary blade to a first cooling circuit in the endwall core opening, the first cooling circuit being in fluid communication with a wheel space adjacent to the stationary blade;
a second chamber in the endwall core opening of the stationary blade directing a second cooling fluid from the stationary blade to a second cooling circuit in the endwall core opening different than the first cooling circuit, wherein a portion of the first cooling fluid passes from the impingement insert through an impingement hole of the stationary blade to cool the stationary blade and create the second cooling fluid, such that the first cooling fluid has a lower temperature than the second cooling fluid, the second chamber in fluid communication with an airfoil passage of the stationary blade delivering the second cooling fluid from the impingement hole to the endwall core opening, wherein the second cooling circuit is in fluid communication with the wheel space adjacent to the stationary blade;
a first member within the endwall core opening, the first member dividing the endwall core opening between the first chamber and the second chamber;
a second member coupled to the first member, the second member blocking a flow of the second cooling fluid from entering the first chamber from the airfoil passage in the stationary blade;
a third chamber in the endwall core opening of the stationary blade directing a third cooling fluid from the stationary blade to a third cooling circuit, different than the first and second cooling circuits; and
a fourth chamber in the endwall core opening of the stationary blade directing a fourth cooling fluid from the stationary blade to a fourth cooling circuit different than the first, second and third cooling circuits.

2. The cooling structure of claim 1, wherein the stationary blade includes an airfoil having an airfoil cooling circuit therein, and the first cooling fluid is extracted from the airfoil cooling circuit at a first location and the second cooling fluid is extracted from the airfoil cooling circuit at a second location, the second location being downstream from the first location such that the first cooling fluid has the lower temperature than the second cooling fluid.

3. The cooling structure of claim 2, further comprising a third chamber in the endwall core opening of the stationary blade directing a third cooling fluid from the stationary blade to a third cooling circuit.

4. The cooling structure of claim 1, wherein the impingement hole comprises one of a first plurality of impingement holes extending through a sidewall of a first insert passage within the stationary blade, and wherein a portion of the first cooling fluid passes through the first plurality of impingement holes to cool the airfoil and create the second cooling fluid, and a remaining portion of the first cooling fluid passes through the first insert passage without passing through the first plurality of impingement holes.

5. The cooling structure of claim 4, wherein the first insert passage delivers the first cooling fluid to the endwall core opening.

6. The cooling structure of claim 5, wherein the endwall core opening includes an internal surface that is one of: stepped and angled relative to an exterior surface of the endwall.

7. The cooling structure of claim 4, wherein the airfoil cooling circuit further includes a second core passage of the airfoil, the second core passage including a second plurality of impingement holes extending through a sidewall wall thereof and a second insert passage at an end thereof adjacent to the endwall, and
wherein a portion of the third cooling fluid passes through the second plurality of impingement holes to cool the airfoil and create the fourth cooling fluid, and a remaining portion of the third cooling fluid passes through the second insert passage without passing through the second plurality of impingement holes.

8. The cooling structure of claim 1, wherein the first cooling circuit is positioned in a leading edge portion of the endwall core opening, and the second cooling circuit is positioned in a trailing edge portion of the endwall core opening.

9. The cooling structure of claim 1, further comprising a first cooling fluid passage in an endwall of the stationary blade from the first chamber to the first cooling circuit; and
a second cooling fluid passage in the endwall of the stationary blade from the second chamber to the second cooling circuit.

10. The cooling structure of claim 1, wherein the first cooling fluid and the third cooling fluid originate from different sources.

11. A stationary blade comprising:
an airfoil having an impingement insert in a core passage thereof, the impingement insert including a plurality of impingement holes through a sidewall thereof and an insert passage at an end thereof; and
a cooling structure in an endwall of the airfoil, the cooling structure including:
a first chamber in an endwall core opening of the stationary blade directing a first cooling fluid from the impingement insert of the airfoil to a first cooling circuit in the endwall core opening, the first cooling circuit being in fluid communication with a wheel space adjacent to the stationary blade; and
a second chamber in the endwall core opening of the stationary blade directing a second cooling fluid from the airfoil to a second cooling circuit in the endwall core opening different than the first cooling circuit, wherein a portion of the first cooling fluid passes from the impingement insert through an impingement hole of the stationary blade to cool the stationary blade and create the second cooling fluid, such that the first cooling fluid passes through the airfoil without passing through the plurality of impingement holes and the second cooling fluid passes through the plurality of impingement holes to cool the airfoil such that the first cooling fluid has a lower temperature than the second cooling fluid, the second chamber in fluid communication with an airfoil passage of the stationary blade delivering the second cooling fluid from the impingement hole to the endwall core opening, wherein the second cooling circuit is in fluid communication with the wheel space adjacent to the stationary blade;
a first member within the endwall core opening, the first member dividing the endwall core opening between the first chamber and the second chamber;
a second member coupled to the first member, the second member blocking a flow of the second cooling fluid from entering the first chamber from the airfoil passage in the stationary blade;
a third chamber in the endwall core opening of the stationary blade directing a third cooling fluid from the stationary blade to a third cooling circuit, different than the first and second cooling circuits; and
a fourth chamber in the endwall core opening of the stationary blade directing a fourth cooling fluid from the stationary blade to a fourth cooling circuit different than the first, second and third cooling circuits.

* * * * *